US012661583B2

(12) United States Patent
Rudi

(10) Patent No.: US 12,661,583 B2
(45) Date of Patent: Jun. 23, 2026

(54) OUTPUTTING BRAILLE OR SUBTITLES USING COMPUTER GAME CONTROLLER

(71) Applicant: Sony Interactive Entertainment Inc., Tokyo (JP)

(72) Inventor: Olga Rudi, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 782 days.

(21) Appl. No.: 17/935,558

(22) Filed: Sep. 26, 2022

(65) Prior Publication Data

US 2024/0100417 A1     Mar. 28, 2024

(51) Int. Cl.
| | |
|---|---|
| *A63F 13/285* | (2014.01) |
| *A63F 13/214* | (2014.01) |
| *A63F 13/49* | (2014.01) |
| *A63F 13/53* | (2014.01) |
| *G09B 21/00* | (2006.01) |

(52) U.S. Cl.
CPC .......... *A63F 13/285* (2014.09); *A63F 13/214* (2014.09); *A63F 13/49* (2014.09); *A63F 13/53* (2014.09); *G09B 21/004* (2013.01); *A63F 2300/1037* (2013.01); *A63F 2300/1068* (2013.01)

(58) Field of Classification Search
CPC ........ A63F 13/00; A63F 13/25; A63F 13/214; A63F 13/49; A63F 13/53; A63F 13/285; A63F 13/80; A63F 2300/1037; A63F 2300/1068; G09B 21/004
See application file for complete search history.

(56) References Cited

U.S. PATENT DOCUMENTS

| | | | | |
|---|---|---|---|---|
| 8,010,366 B1 * | 8/2011 | Kearby | .................. | G10L 15/26 |
| | | | | 704/271 |
| 8,506,369 B2 * | 8/2013 | Grant | .................. | A63F 13/428 |
| | | | | 463/2 |
| 10,607,506 B2 * | 3/2020 | Alanis | .................. | G09B 21/004 |
| 2015/0178939 A1 * | 6/2015 | Bradski | .................. | H04N 13/00 |
| | | | | 345/633 |
| 2018/0185763 A1 | 7/2018 | Bear et al. | | |
| 2018/0214771 A1 * | 8/2018 | Tran | ..................... | A63F 9/0001 |
| 2020/0081598 A1 * | 3/2020 | Fleizach | ............. | G06F 3/04842 |
| 2021/0398452 A1 * | 12/2021 | Californiaa | .......... | G09B 21/007 |
| 2022/0414132 A1 * | 12/2022 | Chandrashekar | ..... | G06F 40/253 |

OTHER PUBLICATIONS

"International Search Report and Written Opinion", dated Feb. 6, 2024, from the counterpart PCT application PCT/US23/74147.

* cited by examiner

*Primary Examiner* — Omkar A Deodhar
(74) *Attorney, Agent, or Firm* — Kilpatrick Townsend & Stockton LLP

(57) ABSTRACT

To help a computer game player in understanding a computer game, upon pausing the game, visual subtitles may be presented. In addition, or alternatively, Braille representing subtitles may be output as a series of vibrations on a touch pad of the controller. When the person's finger reaches the edge of the touch pad, a new series of Braille subtitles may be presented. Depending on where the player is in reading the subtitles and how fast the player reads them, the game video may be slowed down from normal speed.

20 Claims, 5 Drawing Sheets

300 ⌐ Receive Pause Command

302 ⌐ Access Subtitles For Game

304 ⌐ Present On Display

306 ⌐ Track Player Eyes

308 ⌐ Determine Speed Of Reading

310 ⌐ Upon "Play" Alter Speed Of Video According To Reading Speed

400

Game Is Paused

204

NPC A Is About To Shoot Your Character

402

500 — Receive Pause Command

502 — Access Subtitles

504 — Convert To Braille

506 — Output On Controller

508 — Touch At Edge?

No

Yes

510 — Output New Braille

512 — Upon "Play" Alter Speed Of Video According To Finger "Reading" Speed

Braile Using Vibrations

OUTPUTTING BRAILLE OR SUBTITLES USING COMPUTER GAME CONTROLLER

FIELD

The present application relates generally to outputting Braille or subtitles using a computer game controller.

BACKGROUND

As understood herein, some computer gamers may experience difficulty keeping up with game video.

SUMMARY

Accordingly, an apparatus includes at least one processor configured to receive a pause command for a computer simulation, and responsive to the pause command, execute at least one of: (1) present on at least one display visual subtitles, and/or (2) output Braille representing subtitles as a series of vibrations on a computer game controller.

In some embodiments, when Braille is output, the Braille represents subtitles as a series of vibrations on the computer game controller. The series of vibrations can be a first series of vibrations, and the processor can be configured to, responsive to a touch reaching an edge of a touch pad of the controller, present a second series of vibrations representing Braille subtitles on the controller.

In example implementations, the processor may be configured to alter a speed of video presentation of the computer simulation from a first non-zero speed to a second non-zero speed responsive to a speed of reading the subtitles.

In another aspect, a method includes presenting a computer simulation on a display under control of a computer simulation controller. The method also includes receiving a trigger during presentation of the computer simulation, and responsive to the trigger, presenting visual subtitles, and/or outputting Braille representing subtitles as a series of vibrations on the computer game controller.

In another aspect, a device includes at least one computer storage that is not a transitory signal and that in turn includes instructions executable by at least one processor to, during presentation of a computer simulation under control of a computer simulation controller having at least one touchpad, pause the simulation, and responsive to the pause, present subtitles related to the computer simulation in visual and/or tactile form.

The details of the present application, both as to its structure and operation, can be best understood in reference to the accompanying drawings, in which like reference numerals refer to like parts, and in which:

DETAILED DESCRIPTION

Figure 1:
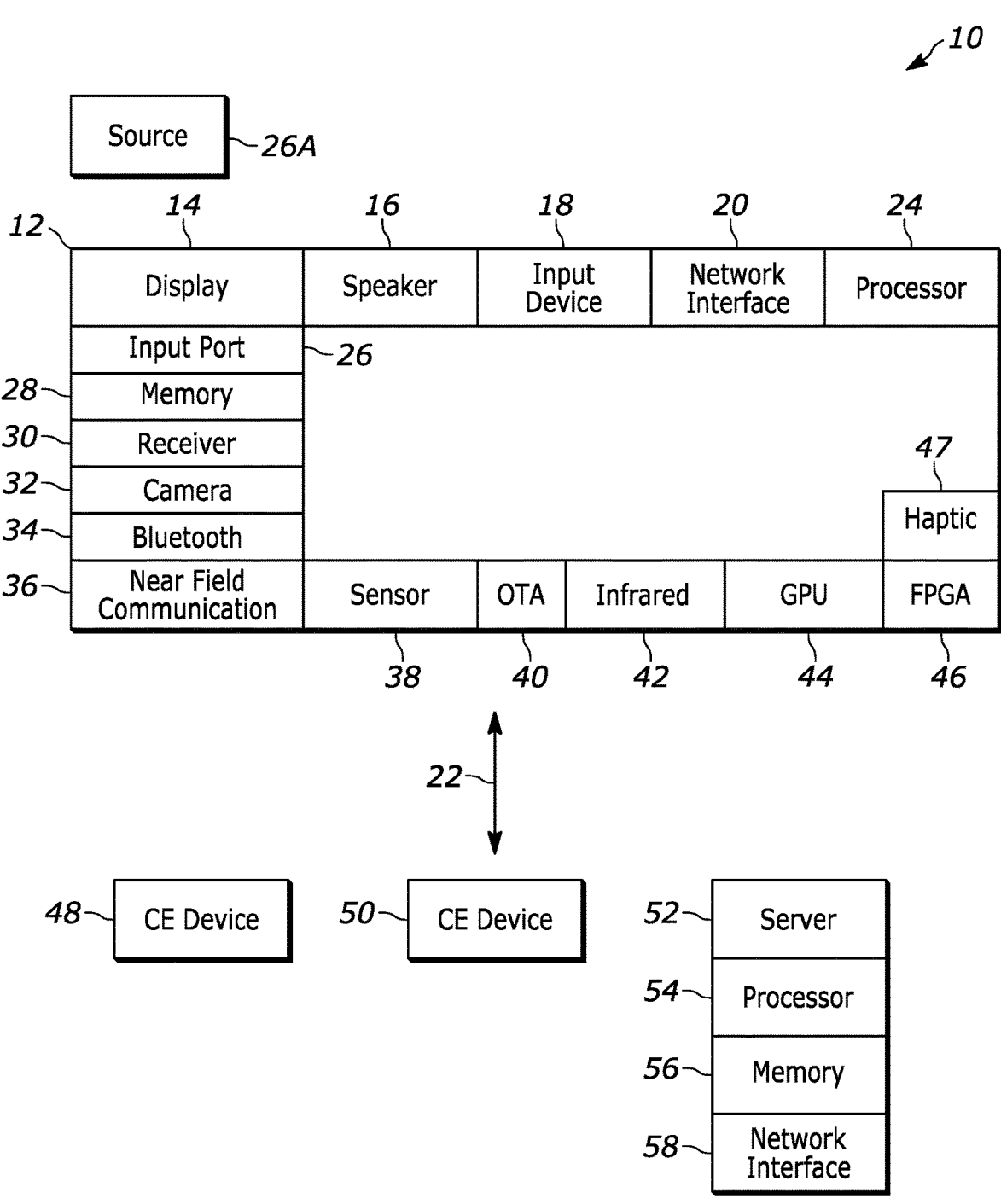
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be $-1$; if it is increasing, the output of the EDS may be a $+1$. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
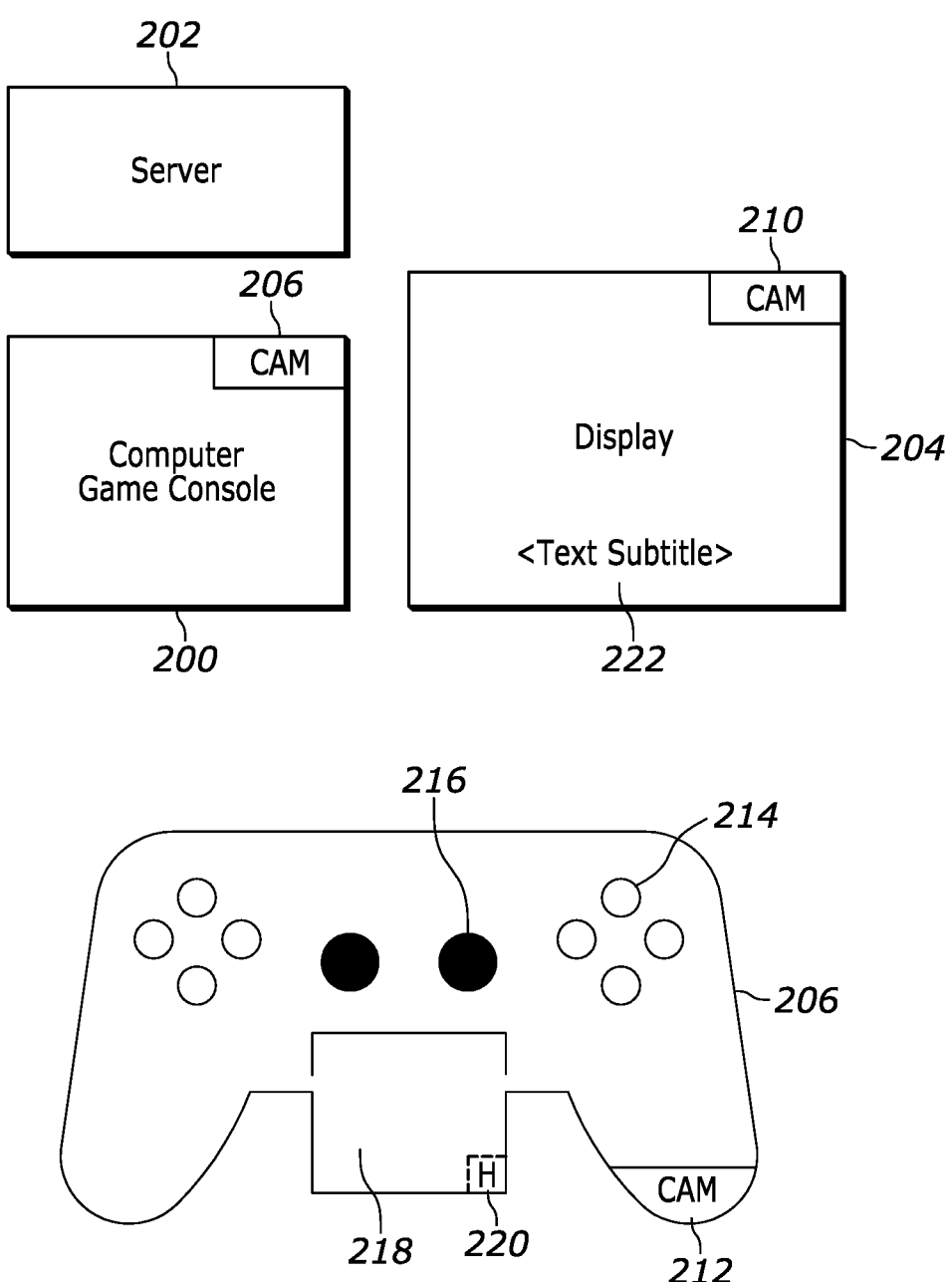
FIG. 2 illustrates an example specific system consistent with present principles.

Refer now to FIG. 2. A computer simulation such as a computer game may be sent from a computer game console 200 or a computer game server 202 to a display device 204 such as a TV for presentation of the computer simulation under control of one or more computer simulation controllers 206, such as but not limited to a PlayStation® controller or other controller. The elements of the system incorporate some or all of the appropriate devices and components described above in reference to FIG. 1.

The console 200 may include one or more cameras 208. Similarly, the display 204 may include one or more cameras 210. Yet again, the controller 206 may include one or more cameras 212.

The controller 206 may include one or more control keys 214 and one or more joystick-like control members 216. The controller 206 also may include one or more touchpads 218. Underlying or otherwise tactilely coupled to the touchpad 218 may be one or more (typically plural) haptic generators 220. Plural haptic generators may be arranged under the touchpad 218 in a stationary grid form. Or, one or more haptic generators 220 may be movable under the touchpad such that a single haptic generator can output a tactile signal at one location on the touch pad at a first time and at another, different location of the touchpad at a second time.

Figures 3, 4:
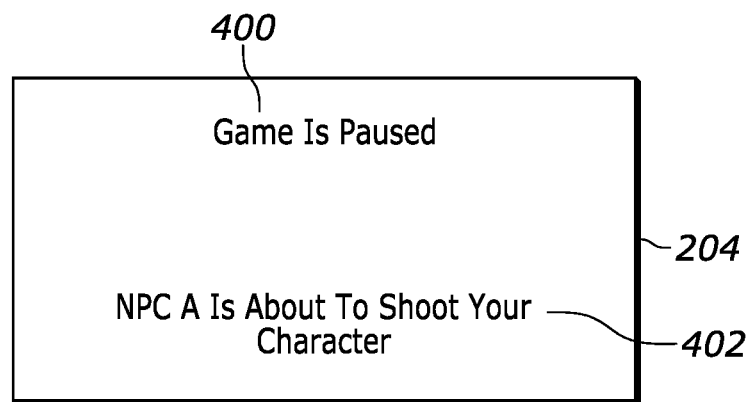
FIG. 3 illustrates example logic in example flow chart format for presenting visual subtitles.
FIG. 4 illustrates an example screen shot consistent with FIG. 3.

FIG. 3 illustrates a first example of use of the system shown in FIG. 2. Commencing at block 300, a trigger is received. In one example, the trigger may be a pause command input by means of the controller 206. The trigger may be established by commands other than a pause command, for example, a play command, a manipulation of a particular key or control on the controller, a voice command to slow down or pause, etc.

Alternatively, the trigger may be established by designating (via a user interface for example) that Braille should always be output on the controller. In this case, a first person can play the game using a player controller and a second, nearby person can simply hold a different controller that has been designated as a Braille feedback controller, with the first person helping the second person keep up with the game story.

The logic in response to the trigger received at block 300 moves to block 302 to access subtitles related to the simulation (also referred to herein as "game") being presented. When the trigger is a pause command, the game also is paused. The subtitles may be accessed from metadata accompanying the audio video data of the game, or may be generated on the fly based on, for example, word recognition of game dialog, image recognition of game scenes, etc. When generated on the fly, one or more machine learning models may be used which are trained on ground truth images and/or words and/or sentences labeled with correct subtitles.

Generally, the subtitles pertain to the current scene being presented, although in some embodiments the subtitles may pertain to other scenes or may be generic to the game as a whole. The subtitles may be derived from current game action using word and/or image recognition.

Moving to block 304, the subtitles are presented on the display 204, as illustrated at 222 in FIG. 2. It will be appreciated that the subtitles typically are alpha-numeric sentences or phrases.

Proceeding to block 306, the player's eyes may be tracked using images from any one or more of the cameras shown in FIG. 2. If the player is wearing a head-mounted display (HMD) a camera in the HMD may be used for this purpose. Based on the eye tracking, at block 308 it is determined how fast the player is reading the subtitles, in on simple example, by determining how long it takes for the eyes to scan from left to right when reading English language subtitles, for instance.

Based on the speed at which the player reads the subtitles, the playback speed of the video and audio of the game may be altered from one non-zero speed to another non-zero speed at block 310 upon such time as the player resumes play. For example, the playback speed may be altered from normal speed to slow speed responsive to a determination at block 308 that the player's reading speed falls below a threshold.

FIG. 4 illustrates. A prompt 400 may be presented on the display 204 that the player has paused the game. One or more subtitles 402 may then appear on screen in accordance with the logic of FIG. 3 informing the player of an interesting or important facet of game play, including game dialog or a summary of game action.

Figure 5:
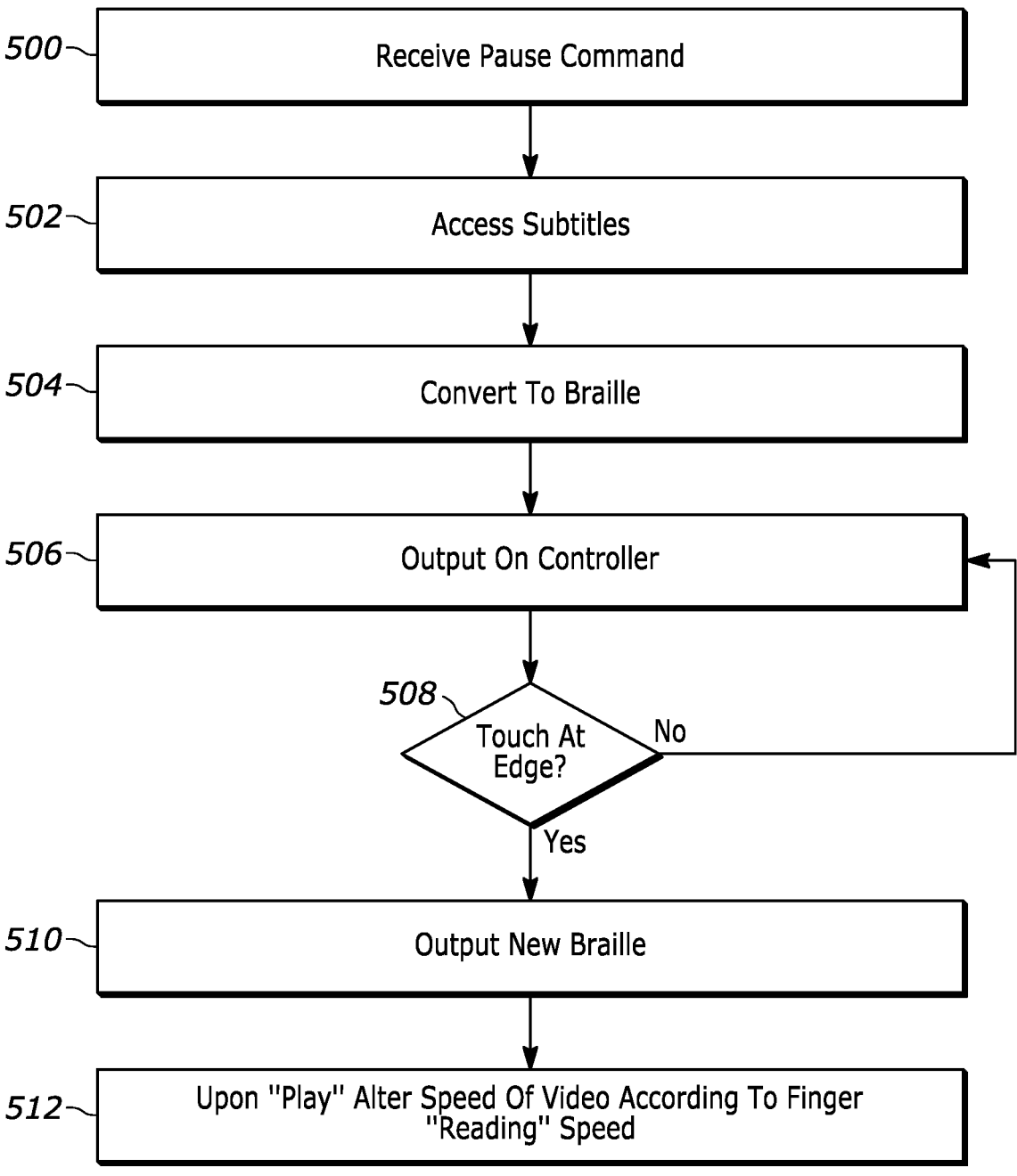
FIG. 5 illustrates example logic in example flow chart format for presenting Braille subtitles.

FIG. 5 illustrates a second example of use of the system shown in FIG. 2. One or both of the techniques of FIGS. 3 and 5 may be implemented responsive to a trigger, e.g., a pause command.

Commencing at block 500, a trigger is received. In one example, the trigger may be a pause command input by means of the controller 206. The trigger may be established by commands other than a pause command, for example, a play command, a manipulation of a particular key or control on the controller, a voice command to slow down or pause, etc.

The logic in response to the trigger received at block 500 moves to block 502 to access subtitles related to the simulation (also referred to herein as "game") being presented using any one or more of the techniques described herein. When the trigger is a pause command, the game also is paused. Generally, the subtitles pertain to the current scene being presented, although in some embodiments the subtitles may pertain to other scenes or may be generic to the game as a whole. The subtitles may be derived from current game action using word and/or image recognition.

Moving to block 504, the subtitles are converted to Braille. In other words, characters in the subtitles are converted to a series of raised dots. Proceeding to block 506, the Braille is output on the controller 206 by means of the haptic generator(s) 220. More specifically, haptic generators, e.g., under the touchpad 218, are activated to produce, in respective small areas of the touchpad just above the haptic generators, tactile signals that a finger can feel. Each haptic generator may be activated only once per group of dots or may vibrate several times for a single group of dots to give the player more time to feel the Braille characters.

Generally, the Braille groups of dots representing letters or numerals in a string of characters in a subtitle are output left to right, or in whichever direction the player is accustomed to read Braille in by moving his or her finger over the dots. Assuming left to right reading, once it is determined at decision diamond 508 that the player's touch has reached the edge of the touchpad, in this case, the right edge, a new string of Braille dots representing the ensuing characters of the subtitle are output on the touchpad at block 510. This continues until the entire subtitle determined at block 502 has been output in Braille on the controller, in the example used, on the touchpad of the controller, it being understood that another surface of the controller may be used.

As indicated at block 512, upon receipt of a play command, based on the speed at which the player read the Braille subtitles as indicated by the length of time it took for the player's touch to move across the touch pad, the playback speed of the video and audio of the game may be altered from one non-zero speed to another non-zero speed. For example, the playback speed may be altered from normal speed to slow speed responsive to a determination that the player's reading speed falls below a threshold.

Figure 6:
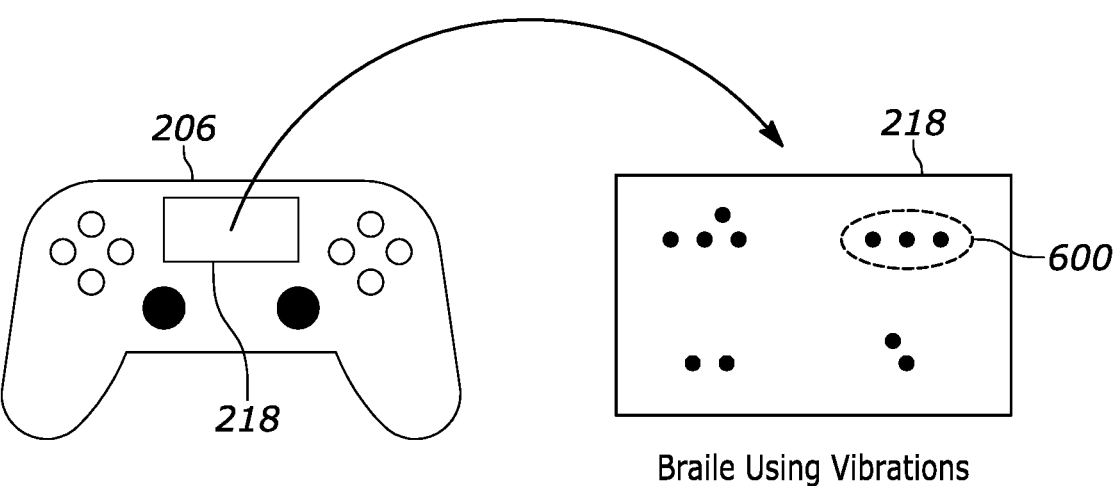
FIG. 6 schematically illustrates presentation of Braille subtitles consistent with FIG. 5.

FIG. 6 illustrates further. Groups of dots 600 representing Braille characters are tactilely output on the controller, e.g., on the touchpad 218 consistent with principles above using one or more activations (vibrations) of the haptic generators 220.

Figure 7:
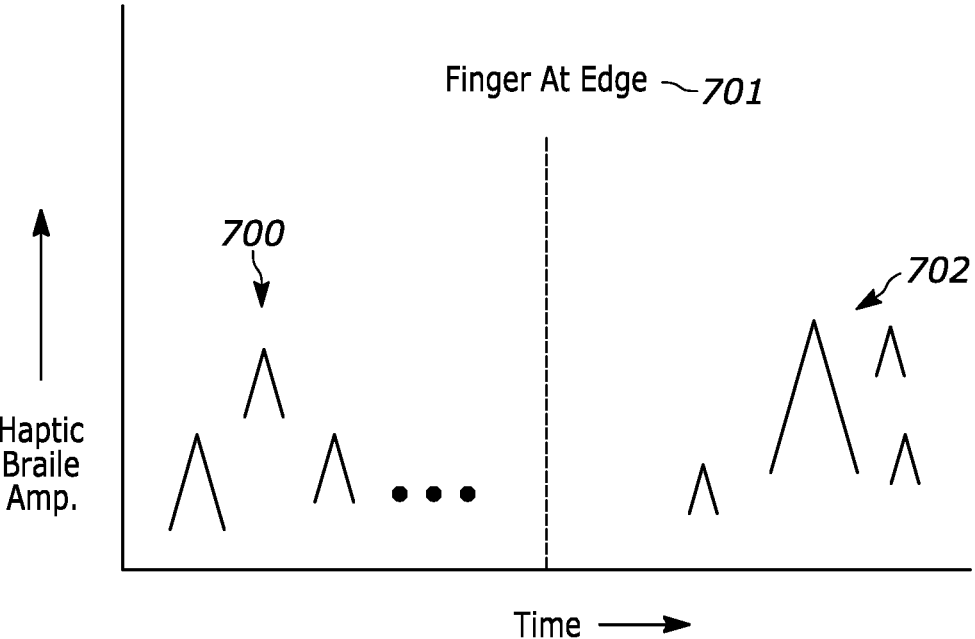
FIG. 7 schematically illustrates Braille vibrations over time.

FIG. 7 illustrates the concept of FIG. 6 in graphical form, in which the y-axis represents the locations of haptic signal amplitude in two dimensions (both the x- and y-dimensions of the touchpad, for instance) over time with the amplitude itself being in the Z-dimension, perpendicular to the surface of the touchpad. A first series of groups of dots 700 representing a first portion of a subtitle is first presented and then when the touch reaches the edge of the touchpad at 701, a second, different series of groups of dots 702 representing the next portion of the subtitle is presented.

While the particular embodiments are herein shown and described in detail, it is to be understood that the subject matter which is encompassed by the present invention is limited only by the claims.

What is claimed is:

1. An apparatus comprising:
at least one processor configured to:
receive an explicit pause command for a computer simulation; and
responsive to the explicit pause command:
halt the computer simulation;
present on at least one display visual subtitles;
synchronously with the presentation of the visual subtitles, output Braille representing subtitles as a series of vibrations on a computer game controller; and
resume the computer simulation after output completion.

2. The apparatus of claim 1, wherein the processor is configured to, responsive to the pause command, present on the at least one display the visual subtitles comprising a transcription of dialog associated with a current scene of the computer simulation.

3. The apparatus of claim 1, wherein the processor is configured to, responsive to the pause command, output the Braille representing subtitles as a series of vibrations on a touch pad of the computer game controller.

4. The apparatus of claim 3, wherein responsive to a touch detected at an edge of the touch pad, the processor is further configured to present a next series of vibrations representing a subsequent portion of the Braille subtitles on the touch pad.

5. The apparatus of claim 1, wherein the processor is configured to, responsive to the pause command, both present on the at least one display the visual subtitles, and output the Braille representing subtitles as a series of vibrations on the computer game controller substantially simultaneously.

6. The apparatus of claim 1, wherein the series of vibrations is a first series of vibrations, and the processor is configured to:

responsive to a touch reaching an edge of a touch pad of the controller, present a second series of vibrations representing Braille subtitles on the controller.

7. The apparatus of claim 1, wherein the processor is configured to:

alter a speed of video presentation of the computer simulation from a first non-zero speed to a second non-zero speed responsive to a speed of reading the subtitles.

8. A method, comprising:

presenting a computer simulation on a display under control of a computer simulation controller;

receiving an explicit pause command during presentation of the computer simulation;

responsive to the explicit pause command:

presenting visual subtitles on the display; and synchronously with the presenting of the visual subtitles, outputting Braille representing subtitles as a series of vibrations on the computer simulation controller.

9. The method of claim 8, comprising, responsive to the pause command, presenting the visual subtitles.

10. The method of claim 8, comprising, responsive to the pause command, outputting the Braille representing subtitles as a series of vibrations on a touch pad of the computer simulation controller.

11. The method of claim 10, wherein, responsive to a touch detected at an edge of the touch pad, presenting a next series of vibrations representing a subsequent portion of the Braille subtitles on the touch pad.

12. The method of claim 8, comprising, responsive to the pause command, both presenting the visual subtitles, and outputting the Braille representing subtitles as a series of vibrations on the computer simulation controller substantially simultaneously.

13. The method of claim 8, wherein the series of vibrations is a first series of vibrations, and the method comprises:

responsive to a touch reaching an edge of a touch pad of the controller, presenting a second series of vibrations representing Braille subtitles on the controller.

14. The method of claim 8 comprising:

altering a speed of video presentation of the computer simulation from a first non-zero speed to a second non-zero speed responsive to a speed of reading the subtitles.

15. A device comprising:

at least one non-transitory computer-readable medium and that comprises instructions executable by at least one processor to:

during presentation of a computer simulation under control of a computer simulation controller comprising at least one touchpad, receive an explicit pause command for the computer simulation; and responsive to the explicit pause command:

halt the computer simulation; and present subtitles related to the computer simulation synchronously in visual and tactile form.

16. The device of claim 15, wherein the instructions are executable to:

responsive to the pause, present subtitles related to the computer simulation in visual form as text on a display, the text comprising a transcription of dialog associated with a current scene of the computer simulation.

17. The device of claim 15, wherein the instructions are executable to:

responsive to the pause, present subtitles related to the computer simulation in tactile form as a series of vibrations corresponding to Braille characters, the vibrations being generated by at least one haptic actuator associated with the touchpad of the computer simulation controller.

18. The device of claim 17, wherein the instructions are executable to:

responsive to a user input selecting a vibration intensity, adjust the series of vibrations representing Braille characters according to the user-selected vibration intensity.

19. The device of claim 17, wherein the tactile form comprises a first series of vibrations and the instructions are executable to:

responsive to a touch reaching an edge of the touch pad of the controller, present a second series of vibrations representing Braille subtitles on the controller.

20. The device of claim 15, wherein the instructions are executable to:

alter a speed of video presentation of the computer simulation from a first non-zero speed to a second non-zero speed responsive to a speed of reading the subtitles.

\* \* \* \* \*